US009384419B2

(12) United States Patent
Konishi

(10) Patent No.: US 9,384,419 B2
(45) Date of Patent: Jul. 5, 2016

(54) IMAGE MATCHING METHOD, EXTRACTING FEATURES FROM MODEL IMAGES APPLIED DIFFERENT VARIATION, IMAGE MATCHING DEVICE, MODEL TEMPLATE GENERATION METHOD, AND MODEL TEMPLATE GENERATION DEVICE

(71) Applicant: OMRON Corporation, Kyoto-shi, Kyoto (JP)

(72) Inventor: Yoshinori Konishi, Osaka (JP)

(73) Assignee: OMRON Corporation, Kyoto-shi, Kyoto (JP)

(*) Notice: Subject to any disclaimer, the term of this patent is extended or adjusted under 35 U.S.C. 154(b) by 0 days.

(21) Appl. No.: 14/273,788

(22) Filed: May 9, 2014

(65) Prior Publication Data

US 2014/0355886 A1  Dec. 4, 2014

(30) Foreign Application Priority Data

May 31, 2013 (JP) ................................ 2013-115617

(51) Int. Cl.
*G06K 9/62* (2006.01)
*G06K 9/46* (2006.01)

(52) U.S. Cl.
CPC ............ *G06K 9/6202* (2013.01); *G06K 9/4609* (2013.01); *G06K 9/4642* (2013.01); *G06K 2009/4666* (2013.01); *G06K 2009/6213* (2013.01)

(58) Field of Classification Search
None
See application file for complete search history.

(56) References Cited

U.S. PATENT DOCUMENTS

| | | | | |
|---|---|---|---|---|
| 2004/0168091 A1* | 8/2004 | Hillhouse | ........... | G06K 9/00087 726/7 |
| 2006/0079777 A1* | 4/2006 | Karasawa | ................ | A61B 8/14 600/443 |
| 2011/0091097 A1* | 4/2011 | Umeda | ......................... | 382/159 |
| 2012/0106800 A1* | 5/2012 | Khan | ................. | G06K 9/00651 382/104 |
| 2014/0079314 A1* | 3/2014 | Yakubovich | ......... | G06K 9/6254 382/159 |
| 2015/0049943 A1* | 2/2015 | Hamsici | ........................ | 382/170 |

OTHER PUBLICATIONS

Konishi et al, "Fast and Precise Template Matching Based on Oriented Gradients," 2012, ECCV, Ws/Demos, Part III, LNCS 7585, pp. 607-610.*
Lee et al, "Visual Tracking by Partitionbased Histogram Backprojection and Maximum Support Criteria," 2011, Proceedings of the 2011 IEEE International Conference on Robotics and Biomimetics, pp. 2860-2865.*
A. Berg et al.; "Geometric Blur for Template Matching"; Computer Society Conference vol. 1., IEEE, 2001 (8 Pages).
Extended European Search Report issued in corresponding European Application No. 14167117.2, mailed on Mar. 9, 2015 (9 pages).
Yoshinori, Konishi; et al.; "Fast and Precise Template Matching Based on Oriented Gradients"; In: Fusiello, A. et al. (Eds.); "ECCV 2012 Ws/Demos, Part III"; Springer Verlag, Lecture Notes in Computer Science; Oct. 7, 2012; pp. 608-609 (4 pages).

(Continued)

*Primary Examiner* — David F Dunphy
(74) *Attorney, Agent, or Firm* — Osha Liang LLP

(57) ABSTRACT

An image matching method performed by an image matching device, includes acquiring a model image, generating a plurality of variation images by applying to the model image variations that are different from each other, extracting features from each of the plurality of variation images, generating a model template based on the features, and performing template matching using an image to be matched and the model template.

4 Claims, 7 Drawing Sheets

(56) References Cited

OTHER PUBLICATIONS

Prince, Simon J. D.; "Chapter 13: Image preprosessing and feature extraction"; In: "Computer Vision—Models, Learning, and Inference"; 2012; Cambridge University Press, New York, USA; pp. 269-294 (26 pages).

Decarlo, Lawrence T.; "On the Meaning and Use of Kurtosis"; Psychological Methods, vol. 2, No. 3; Jan. 1997; pp. 292-307 (16 pages).

Pouli, Tania et al.; "A Survey of Image Statistics Relevant to Computer Graphics"; Computer Graphics Forum, vol. 30, No. 6; Apr. 21, 2011; pp. 1761-1788 (28 pages).

Cui, Jingyu; et al.; "Real Time Google and Live Image Search Re-ranking"; Proceeding of the 16th ACM International Conference on Multimedia; Jan. 2008; p. 729; New York, New York, USA (4 pages).

Catano, M.A.; et al.; "Keypoint Detection Based on the Unimodality Test of HOGs"; Jul. 16, 2012; Advances in Visual Computing; Berlin; pp. 189-198 (10 pages).

Chandrasekhar, Vijay; et al.; "Compressed Histogram of Gradients: A Low-Bitrate Descriptor"; International Journal of Computer Vision; Kluwar Academic Publishers; vol. 96, No. 3; May 15, 2011; pp. 384-399 (16 pages).

\* cited by examiner

SEGMENTATION (GRIDDING) OF A MODEL IMAGE

REGION (EXAMPLE: 3×3 PIXELS)

EXTRACTION OF BRIGHTNESS GRADIENT DIRECTION COMPONENTS

QUANTIZATION OF BRIGHTNESS GRADIENTS

MODEL IMAGE

GENERATION OF VARIATION IMAGES

EXTRACTION OF GRADIENT DIRECTION FEATURES

CREATION OF A FEATURE DISTRIBUTION

MODEL IMAGE

FEATURE DISTRIBUTION IN REGION 51

FEATURE DISTRIBUTION IN REGION 52

FEATURE DISTRIBUTION IN REGION 53

IMAGE MATCHING METHOD, EXTRACTING FEATURES FROM MODEL IMAGES APPLIED DIFFERENT VARIATION, IMAGE MATCHING DEVICE, MODEL TEMPLATE GENERATION METHOD, AND MODEL TEMPLATE GENERATION DEVICE

BACKGROUND

1. Field

The present invention relates to a technique for matching an image using template matching.

2. Related Art

When an object is detected by template matching, the occurrence of variation between a registered image and an image to be matched reduces the detection accuracy. The variation refers herein to displacement and rotation, enlargement and reduction, slight deformation of an object, change of lighting, addition of image noise, etc., for example.

In view of the above, a plurality of model templates corresponding to various variations can be prepared. For example, model templates are generated from model images taken from different angles, model images taken under different lighting, or model images to which noise is added. Thus, detection is possible even if variation is applied.

Also, in view of the above, Berg, Alexander C., and Jitendra Malik. "Geometric blur for template matching." Computer Vision and Pattern Recognition, 2001. CVPR 2001. Proceedings of the 2001 IEEE Computer Society Conference on. Vol. 1. IEEE, 2001 proposes a method referred to as "Geometric Blur". This method applies a Gaussian filter having a larger variance at a greater distance from the origin in view of the position of a feature and thus the method can perform template matching that is robust to variations.

Since a method that generates and uses the plurality of model templates needs the same number of search processes as the number of the model templates, the processing time increases linearly according to the number of the model templates.

Furthermore, the method described in the above-mentioned Berg, Alexander C., and Jitendra Malik. "Geometric blur for template matching." Computer Vision and Pattern Recognition, 2001. CVPR 2001. Proceedings of the 2001 IEEE Computer Society Conference on. Vol. 1. IEEE, 2001, which applies a Gaussian filter, can be applied only to features (e.g., brightness features) that are continuous quantities and have a unimodal distribution. If the above condition is not satisfied, such as the case where quantized brightness gradient directions are used as features, the method of the above-mentioned Berg, Alexander C., and Jitendra Malik. "Geometric blur for template matching." Computer Vision and Pattern Recognition, 2001. CVPR 2001. Proceedings of the 2001 IEEE Computer Society Conference on. Vol. 1. IEEE, 2001 cannot be employed.

SUMMARY

One or more embodiments of the present invention provides a template matching technique that is robust to variations.

An image matching method according to one or more embodiments of the present invention applies various expected variations to a model image, extracts features from these variation images, and generates a template using the features appearing stable under various variations.

An image matching method according to one or more embodiments of the present invention, which is performed by an image matching device, includes the steps of: acquiring a model image; generating a plurality of variation images by applying to the model image variations that are different from each other; extracting features from each of the plurality of variation images; generating a model template based on the features; and performing template matching using an image to be matched and the model template.

The variation applied to the model image may be any type. According to one or more embodiments of the present invention, the variation may be at least any of rotation, enlargement and reduction, deformation, change of lighting, and addition of image noise, for example.

Thus, even if variation occurs at the time of matching, an object can be accurately detected by considering the variation at the time of generating the model template. Although various variations are applied to the model image, a single template is generated so that processing speed does not decrease at the time of matching.

According to one or more embodiments of the present invention, the step of extracting the feature segments each of the variation images into a plurality of regions and extracts the feature of each region from the variation images, where a feature may be extracted from a region or a feature may be extracted from each of multiple sub-regions that make up the region. In any case, the distribution of the features in each of the regions is obtained by extracting the features for each of the regions from the plurality of variation images. A quantized brightness gradient direction can be used as a feature, for example.

The step of generating a template according to one or more embodiments of the present invention generates a model template using the distribution of the features, each of which is extracted in each region above in the step of extracting features. Here, the model template may be generated using the distribution itself of the features, or it may be generated using parameters (such as mode and average) characterizing the distribution of the features.

Alternatively, the model template may be generated using features, a large proportion of which is extracted in each region. Here, the features, a large proportion of which is extracted, may refer to a predetermined number of features from the feature with highest frequency of occurrence, or it may refer to features having probability of occurrence greater than or equal to a predetermined value. For example, it is contemplated to generate a model template using the mode of the features or using features having probability of occurrence greater than or equal to a threshold (for example, 20%).

The step of generating a template according to one or more embodiments of the present invention generates a model template using the features of the regions where the number of the features extracted is large in the step of extracting features. Here, it is assumed that the feature may or may not be obtained from the region. Examples of such feature include a feature on a brightness gradient. While the feature of the brightness gradient is obtained from a region with an edge, the feature of the brightness gradient is not obtained from a region with no edge. Therefore, when such features are extracted from a plurality of variation images, the number of features extracted (i.e., extraction frequency) may differ depending on the region. As described above, the generation of a model template using the features of the regions where the number of the features extracted is large can reflect the features that are likely to appear in common under various variations in the model template, thereby improving matching accuracy under variations. Moreover, matching speed is increased due to a smaller number of features. Note that the term the "region where the number of the features extracted is large" may refer to a region where the number of features extracted from the region is greater than or equal to a predetermined threshold, or may refer to a region where the number of features to be extracted is in a predetermined top percentage.

The step of generating a template according to one or more embodiments of the present invention generates a model template using the features of the regions where the kurtosis of the distribution of the features is high. The high kurtosis of the feature distribution means to be able to obtain a common feature under various variations. Therefore the generation of a model template using such feature can improve matching accuracy under variations and can speed up matching process.

While the foregoing generates the model template using only features of the regions where the frequency of occurrence of the features is high or where the kurtosis of the feature distribution is high, the frequency of occurrence and the kurtosis may be used as a weight when matching is performed. That is, according to one or more embodiments of the present invention, an index value for the region is determined and assigned based on the frequency of occurrence of the features or the kurtosis of the feature distribution in each region, weighting is performed based on the index value assigned to each of the regions in the step of performing the template matching, and template matching between an input image and a model template is performed. In this regard, the greater the frequency of occurrence and the kurtosis are, the more weight is provided. In other words, in the regions where the frequency of occurrence of the features is higher or where the kurtosis of the feature distribution is higher, the degree of influence exerted on a matching score is more increased. Thus, matching accuracy can be improved even if variation may be applied.

One or more embodiments of the present invention may be considered as an image matching method including at least part of the processing described above. One or more embodiments of the present invention may also be considered as a method for generating a model template used in the image matching method. One or more embodiments of the present invention may also be considered as an image matching device and a model template generation device that are provided with means for performing the image matching method and the method for generating the model template. Furthermore, one or more embodiments of the invention may also be considered as a computer program for causing a computer to execute the image matching method and the method for generating the model template. One or more embodiments of the invention may be practiced by combining the above-described means and processes with each other as far as possible.

One or more embodiments of the present invention can perform template matching that is robust to variations.

BRIEF DESCRIPTION OF THE DRAWINGS

FIG. 4A shows the segmentation of a model image, FIG. 4B shows the segmented regions, FIG. 4C shows the calculation of features from the region, and FIG. 4D shows the quantization of brightness gradient direction features;

FIG. 5A shows a model image, FIG. 5B shows variation images, FIG. 5C shows brightness gradient direction features extracted from the variation images, and FIG. 5D shows the distribution of the brightness gradient direction features;

FIG. 6A shows a model image, and FIGS. 6B to 6D show the feature distributions in each region.

DETAILED DESCRIPTION

Embodiments of the invention will be described hereafter in detail with reference to the drawings. However, unless specifically stated, characteristics such as dimensions, materials, shapes, relative arrangement, etc. of components described in the embodiments are not intended to limit the scope of the invention only to these characteristics. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Image matching device 100 of one or more embodiments of the present invention, which is incorporated into a production line, etc., acquires an image of a workpiece that is fed by a conveyor belt and performs pattern matching using a model (model template) that has been registered corresponding to the image in advance.

Figure 2:
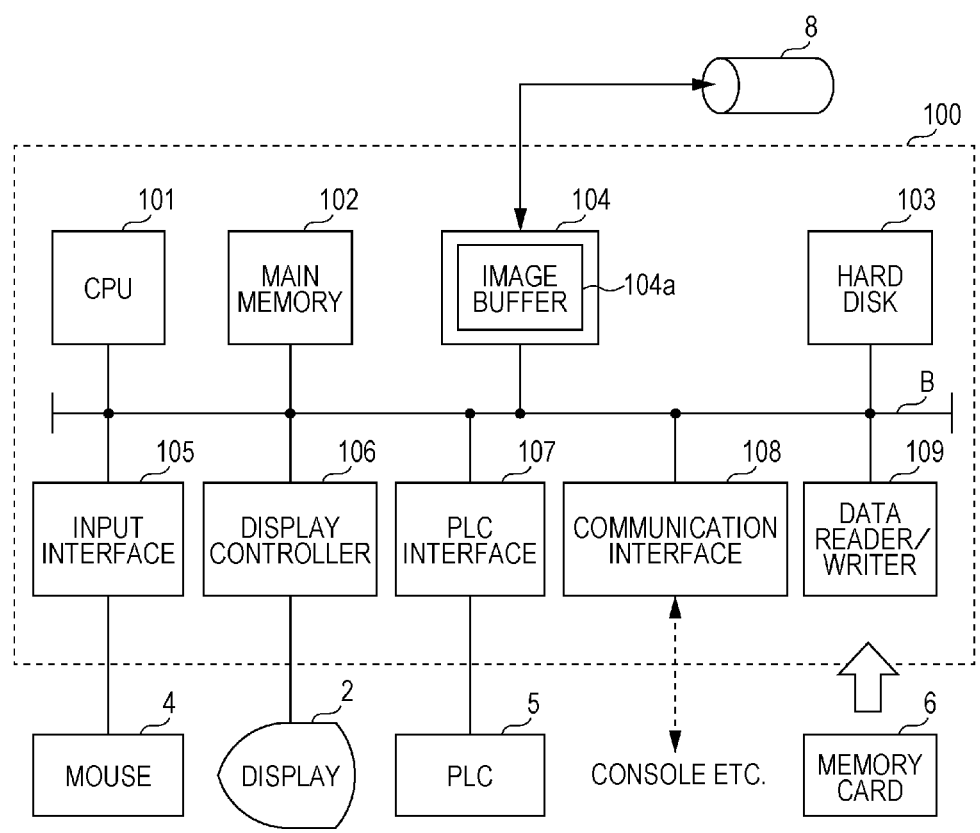
FIG. 2 is a diagram showing a hardware configuration of the image matching device according to one or more embodiments of the present invention.

FIG. 2 is a schematic block diagram of image matching device 100 according to one or more embodiments of the present invention. Referring to FIG. 2, image matching device 100 includes CPU (central processing unit) 101 as an arithmetic processing unit, main memory 102 as a memory unit and hard disk 103, camera interface 104, input interface 105, display controller 106, PLC (programmable logic controller) interface 107, communication interface 108, and data reader/writer 109. These components are communicatively coupled to each other via bus B.

CPU 101 expands programs (codes) stored in hard disk 103 to main memory 102 and performs various operations by executing the programs in a predetermined order. Main memory 102 is typically a volatile storage device such as a DRAM (dynamic random access memory) and holds image data acquired by imaging device 8, workpiece data, and information about models in addition to the programs from hard disk 103. Hard disk 103 may also store set values, for example. A semiconductor memory device such as a flash memory may be used in addition to or instead of hard disk 103.

Camera interface 104 mediates data transmission between CPU 101 and imaging device 8. That is, camera interface 104 is connected to imaging device 8 for capturing a workpiece image to generate image data. Specifically, camera interface 104 can be connected to one or more imaging devices 8 and includes image buffer 104a for temporarily storing image data from imaging device 8. When image buffer 104a stores a predetermined number of frames of image data, camera interface 104 transfers the image data stored to main memory 102. Camera interface 104 sends an imaging command to imaging device 8 according to an internal command generated by CPU 101.

Input interface 105 mediates data transmission between CPU 101 and input units such as a mouse 4, keyboard, touch panel, etc. That is, input interface 105 receives an operation command provided by a user operating the input unit.

Display controller 106, which is connected to display 2 as a typical display device, notifies the user of the result of image processing in the CPU 101, for example. That is, display controller 106, being connected to display 2, controls the display of display 2.

PLC interface 107 mediates data transmission between CPU 101 and PLC 5 controlling a workpiece conveying mechanism. Specifically, PLC interface 107 transmits information about the state of the production line controlled by PLC 5, information about the workpiece, and the like to CPU 101.

Communication interface 108 mediates data transmission between CPU 101 and a console (or personal computer or server) and the like. Typically, communication interface 108 includes Ethernet (registered trademark), Universal Serial Bus (USB), or the like. A program that is downloaded from a distribution server etc. via communication interface 108 may be installed in image matching device 100 instead of installing the program stored in memory card 6 in image matching device 100 as described below.

Data reader/writer 109 mediates data transmission between CPU 101 and memory card 6 as a recording medium. That is, memory card 6 is distributed with programs executed in image matching device 100 stored therein, and data reader/writer 109 reads the programs from memory card 6. In response to an internal command of CPU 101, data reader/writer 109 also writes image data acquired by imaging device 8 and/or the processing result of image matching device 100 and the like to memory card 6. Memory card 6 includes a general-purpose semiconductor device such as CF (Compact Flash) or SD (Secure Digital), a magnetic storage medium such as a flexible disk, an optical storage medium such as a CD-ROM (compact disk read-only memory), or the like.

Image matching device 100 may be connected to other output devices such as a printer and the like as needed.

Figure 1:
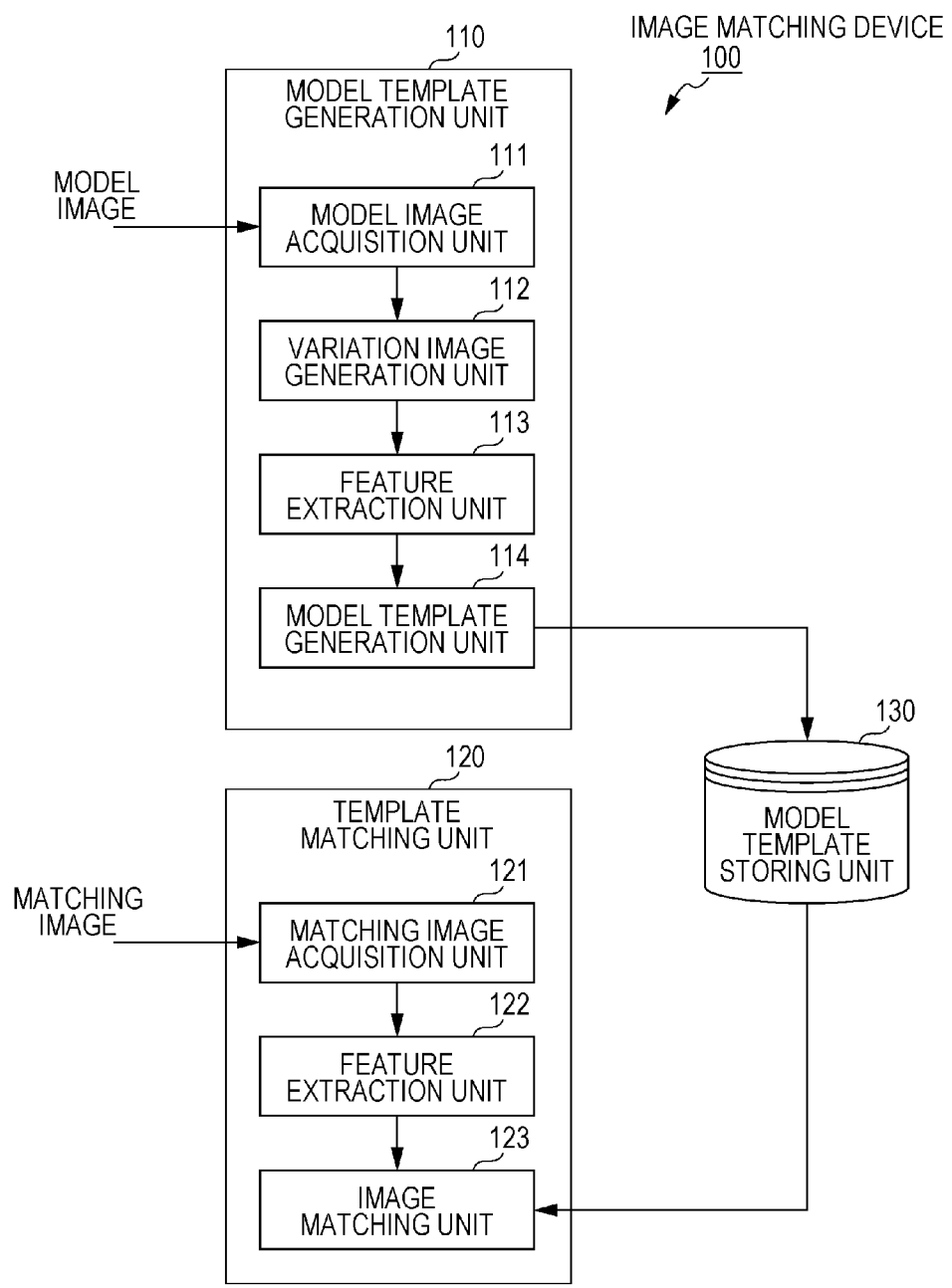
FIG. 1 is a diagram showing functional blocks of an image matching device according to one or more embodiments of the present invention.

FIG. 1 shows functional blocks of image matching device 100 according to one or more embodiments of the present invention. As described above, CPU 101 of image matching device 100 executes pre-installed programs (such as an OS, application programs, etc.), thereby performing functions shown in FIG. 1. Part or all of the functions shown in FIG. 1 may be performed by a dedicated hardware.

As shown in FIG. 1, image matching device 100 includes mainly model template generation unit 110 and template matching unit 120. Model template generation unit 110 is a functional unit for generating a model template from a model image. The model template generated by model template generation unit 110 is stored in model template storing unit 130. Template matching unit 120 is a functional unit that receives an image to be matched (i.e., a matching image) as an input image and determines whether the matching image matches the model template using the model template stored in model template storing unit 130.

Figure 3:
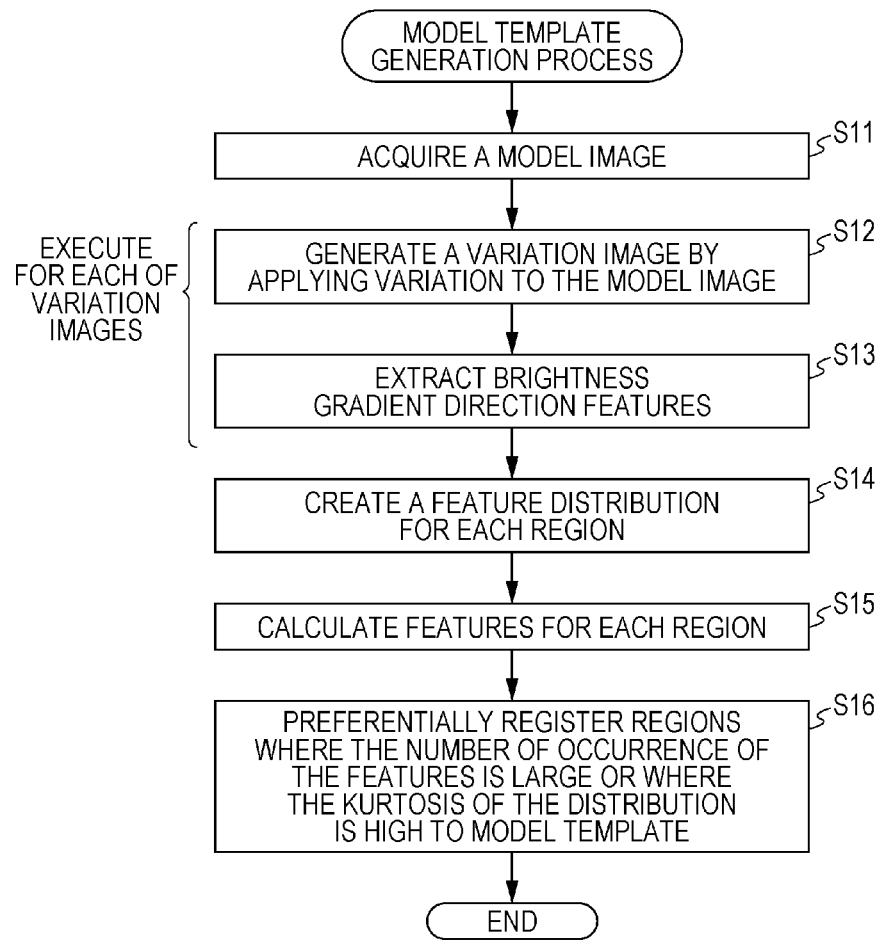
FIG. 3 is a flow chart illustrating the flow of a model template generation process.
Figure 7:
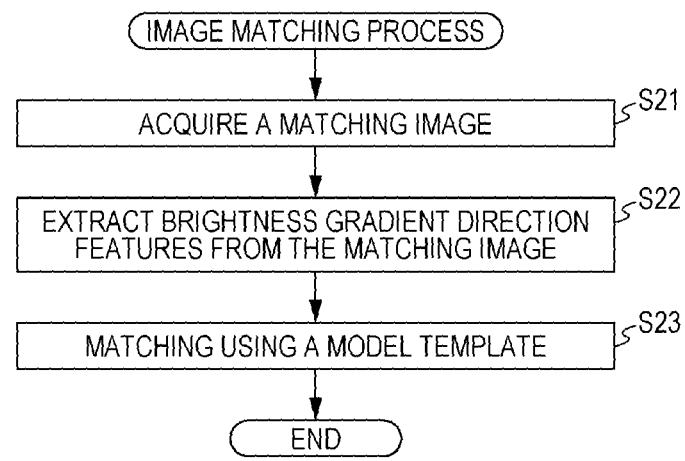
FIG. 7 is a flow chart illustrating the flow of an image matching process.

Model template generation unit 110 includes model image acquisition unit 111, variation image generation unit 112, feature extraction unit 113, and model template generation unit 114. FIG. 3 is a flow chart illustrating the flow of a model template generation process performed by model template generation unit 110. Template matching unit 120 includes matching image acquisition unit 121, feature extraction unit 122, and image matching unit 123. FIG. 7 is a flow chart illustrating the flow of an image matching process (template matching process) performed by template matching unit 120. The details of the functional units will now be discussed in turn with reference to the drawings.

[Model Template Generation Process]

The model template generation process performed by model template generation unit 110 is first described. One or more embodiments of the present invention generates a model template capable of robustly detecting an object even if environment of capturing an image to be matched varies from environment of capturing a model image that is used when the model template is generated. Differences in the environment result from brightness, image noise, and rotation, changes in size and deformation of the object, for example. In order to enable robust image matching, model template generation unit 110 generates a plurality of variation images by applying various expected variations to an input model image and generates a single model template based on the distribution of features obtained from the plurality of variation images.

[Acquisition of Model Image]

In order to generate a model template, model image acquisition unit 111 first acquires a model image (S11). The model image is an image where an object to be detected by template matching is captured. Acquisition of the model image using model image acquisition unit 111 may be performed by any method. For example, model image data stored in a storage medium may be read, or model image data is acquired or obtained over a network. Alternatively, model image acquisition unit 111 may also acquire data captured by an imaging device that is incorporated into image matching device 100.

[Generation of Variation Images]

Variation image generation unit 112 then applies to the model image variations that are different from each other and generates a plurality of variation images (S12). Examples of variations are rotation, enlargement and reduction, deformation, change of lighting, addition of image noise, and the like. Variation image generation unit 112 applies variation obtained by combining one or more of these variations to the model image and generates a variation image. According to one or more embodiments of the present invention, the type of the variation applied and the extent of the variation are determined in consideration of the variation to be expected when the object is actually detected. Variation image generation unit 112 may generate any number of variation images and it may be considered to generate thousands to tens of thousands of variation images, for example.

[Extraction of Features]

Figure 4A:
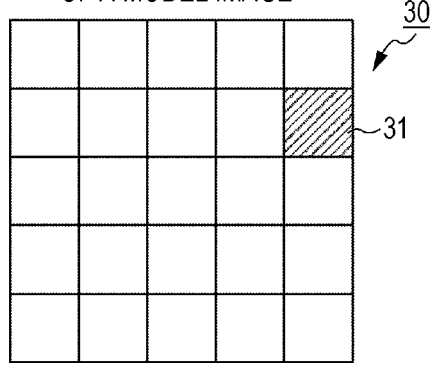
FIGS. 4A to 4D are diagrams showing feature extraction, where
Figure 4B:
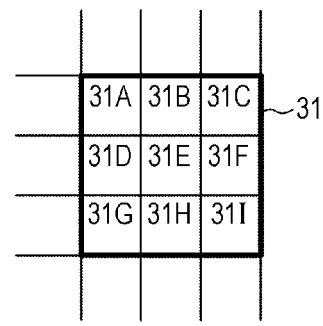

Next, feature extraction unit 113 extracts features from each of the variation images (S13). One or more embodiments of the present invention employs a brightness gradient direction feature as a feature to be extracted. The brightness gradient direction feature is described below with reference to FIGS. 4A to 4D. As shown in FIG. 4A, feature extraction unit 113 segments variation image 30 into a plurality of regions. In one or more embodiments of the present invention, variation image 30 is segmented into regions, each of which has a size of 3 pixels by 3 pixels. FIG. 4B is an enlarged view of region 31 in FIG. 4A. As shown in FIG. 4B, region 31 consists of 9 pixels 31A to 31I, i.e., 3×3 pixels. Each of the regions may be any size other than 3×3 pixels and the regions may be segmented so as to overlap each other.

Figure 4C:
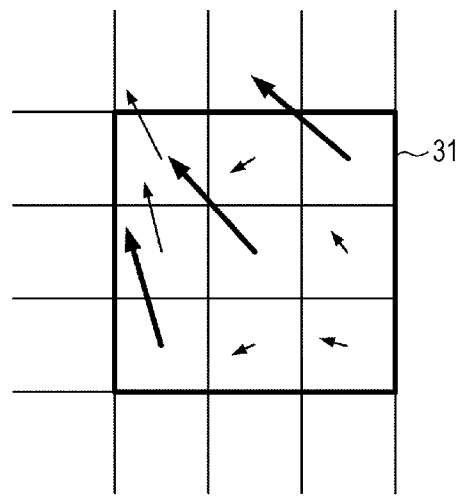

Feature extraction unit 113 determines a direction and magnitude (intensity) of a brightness gradient for each pixel within the segmented region. The brightness gradient can be determined from a target pixel and its surrounding pixels. FIG. 4C shows the brightness gradient obtained for each pixel within region 31, where the direction of an arrow indicates the direction of the brightness gradient and the length of the arrow represents the magnitude of the brightness gradient. Bold arrows in FIG. 4C indicate that the brightness gradient intensity is greater than or equal to a predetermined threshold. In one or more embodiments of the present invention, when the brightness gradient intensity for a pixel is less than a predetermined threshold, the brightness gradient is not considered detected from the pixel. In the example of FIG. 4C, it is regarded that the brightness gradient has been detected only from three pixels 31C, 31E, and 31G.

Figure 4D:
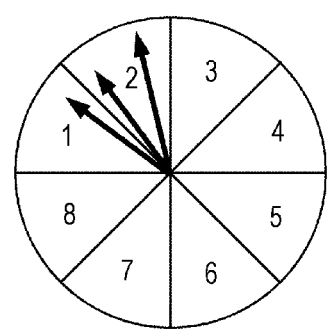

The direction of the brightness gradient is represented in a quantized manner as shown in FIG. 4D and it is classified into eight directions in one or more embodiments of the present invention. Accordingly, one brightness gradient in direction 1 and two brightness gradients in direction 2 are extracted from region 31 shown in FIG. 4C. Quantization of the brightness gradient direction may be performed by any method.

The above processing is performed for all regions within model image 30, and thus the extraction of the brightness gradient direction features for a single variation image is completed.

Figure 5A:
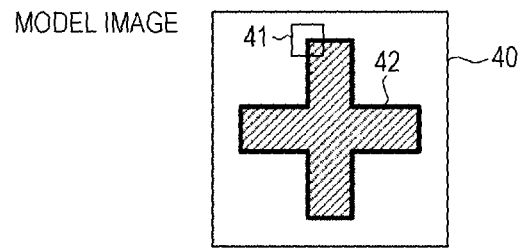
FIGS. 5A to 5D are diagrams showing the process of creating a feature distribution, where

Feature extraction unit 113 performs the above processing for all variation images and integrates the distribution of the brightness gradient direction features for each region, thereby creating the feature distribution in each region (S14). Creation of the feature distribution from a plurality of variation images is described with reference to FIGS. 5A to 5D. FIG. 5A is a diagram showing model image 40 where detection target object 42 is captured. Note that although the inside of detection target object 42 is hatched in the figure, it is intended that the inside and border thereof have the same brightness. The process of creating the feature distribution is described below with reference to region 41 of model image 40 as an example.

Figure 5B:
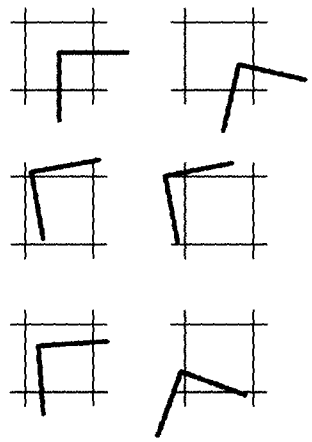
Figure 5C:
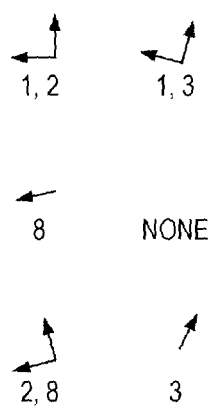

FIG. 5B shows images in region 41 when various variations (which are, however, limited to rotation and enlargement and reduction here) are applied to model image 40. Without the variation, region 41 includes a corner (i.e., vertical and horizontal edges) of object 42, while the direction of the edges varies or one or both of edges get out of region 41 due to the variation. FIG. 5C shows the result of extraction of a brightness gradient direction feature from region 41 of each of the variation images shown in FIG. 5B. One or more brightness gradient direction features can be obtained from each variation image. The brightness gradient extracted is different depending on the variation applied; however, the average probability of obtaining a brightness gradient similar to that of a model image is high.

While variations applied to the model image are described as rotation and enlargement and reduction in the example of FIG. 5B, a similar process can obviously be performed even when variations such as change of lighting and addition of image noise are applied.

Figure 5D:
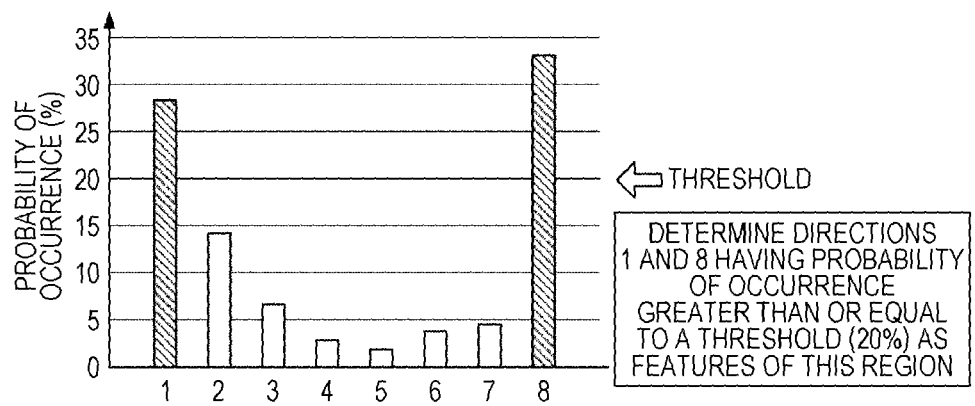

In this way, feature extraction unit 113 creates the distribution of the brightness gradient direction features for a region obtained from the plurality of variation images. FIG. 5D is a diagram showing the feature distribution in region 41 of model image 40. In FIG. 5D, the abscissa represents quantized brightness gradient direction features and the ordinate represents the probability of occurrence of the brightness gradient direction features. The probability of occurrence means the percentage of features in a given direction to total features extracted from a given region. This example shows that brightness gradient direction features extracted from region 41 and having a higher frequency of occurrence are directions 1 and 8.

Feature extraction unit 113 calculates a feature for use in generating a model template for each of the regions of the model image based on the distribution of the brightness gradient direction features created in step S14 (S15). One or more embodiments of the present invention employs a brightness gradient direction feature having a high probability of occurrence (percentage of occurrence) in the region as a feature used to generate the model template for each region. Here, the brightness gradient direction feature having a high probability of occurrence (percentage of occurrence) is one that has the probability of occurrence (percentage of occurrence) higher than or equal to a predetermined threshold. In the case of using 20% as a threshold, brightness gradient direction features of directions 1 and 8 are determined as features used to generate the model template based on the distribution shown in FIG. 5D.

The feature used to generate the model template may be selected based on criteria other than the above. For example, the distribution itself of the brightness gradient direction features created in step S14 may be used as a feature to generate the model template. Other alternatives such as the mode in the distribution, the presence or absence of a feature represented by "0" or "1", and the probability itself of occurrence may be used.

[Generation of Model Template]

Model template generation unit 114 generates a model template based on the features calculated by feature extraction unit 113 (S16), at which time the model template is generated with a preference for regions where the number of occurrences of the features is large or where the kurtosis of the distribution is high.

Figure 6A:
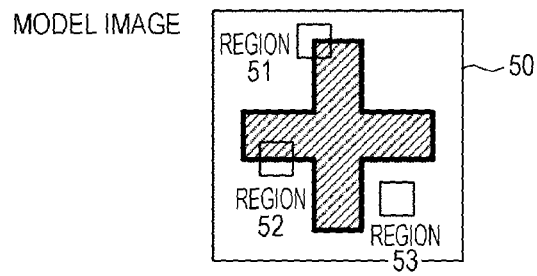
FIGS. 6A to 6D are diagrams showing the process of generating a model template based on feature distributions, where
Figure 6B:
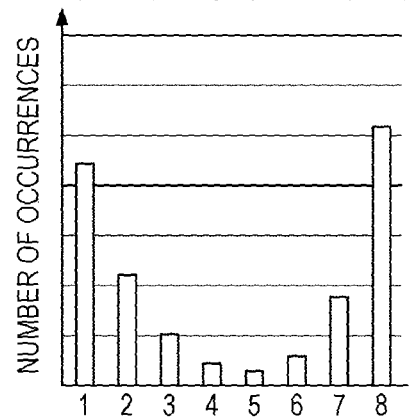
Figure 6C:
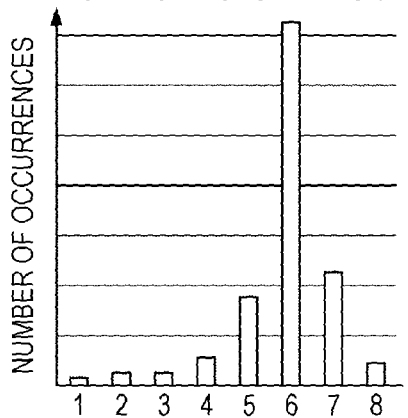
Figure 6D:
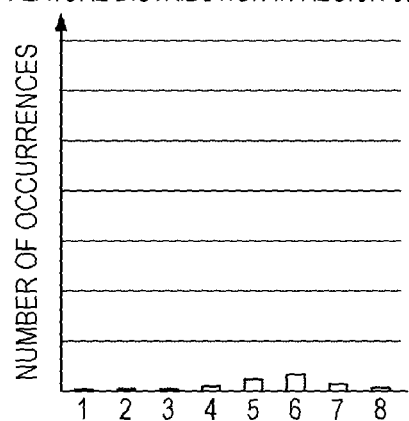

For example, when the model template is generated with a preference for the regions where the number of occurrences of the features is large, the model template is generated using the features of the regions where the number of occurrences of the features is greater than or equal to a predetermined threshold or where the number of occurrences of the features is in a predetermined top percentage (e.g., the top 25%). The description is made with reference to FIGS. 6A to 6D. FIG. 6A shows model image 50 and its three regions 51, 52, and 53. FIGS. 6B to 6D show the distribution of brightness gradient direction features in each of the regions 51 to 53. In FIGS. 6B to 6D, the ordinate represents the number of features extracted in step S13. In this example, the number (total sum) of occurrences of the features in regions 51 and 52 is determined to be greater than or equal to a predetermined threshold, and the number of occurrences of the features in region 53 is determined to be less than a predetermined threshold. In such a case, model template generation unit 114 generates the model template using the features obtained from regions 51 and 52.

When a model template is generated from the regions where the kurtosis of the distribution of the features is high, the same is true in the above. That is, the model template is generated using features of the regions where the kurtosis of the feature distribution is higher than or equal to a predetermined threshold. Here, the kurtosis may be any index that represents sharpness of peak of frequency distribution and takes a higher value corresponding to a sharper peak.

A method of generating a model template with a preference for regions where the number of occurrences of the features is large or where the kurtosis of the distribution is high may preferably increase weight for such regions. In this case, an index value for the region is calculated based on the number of occurrences of the features or the kurtosis of the distribution in each region, and the model template is generated using the index value as a weight at the time of matching in each region above.

The model template generated by model template generation unit 114 is stored in model template storing unit 130.

[Template Matching Process]

Finally, a template matching process (image matching process) performed by template matching unit 120 is described with reference to the flow chart of FIG. 7. Matching image acquisition unit 121 first acquires a matching image (S21). The matching image is an image to be a target from which an object is detected using the model template. Acquisition of the matching image using matching image acquisition unit 121 may be performed by any method as with the case of model image acquisition unit 111.

Feature extraction unit 122 extracts brightness gradient direction features from the matching image (S22). The process of extracting the features is similar to the process (step S13 and FIGS. 4A to 4D) using feature extraction unit 113. Feature extraction unit 113 obtains the brightness gradient direction features from each of the regions of the matching image.

Image matching unit 123 then compares the features obtained by feature extraction unit 122 with the model template to determine whether the matching image includes the object to be matched. This process makes a determination based on the similarity of the model template and the features obtained from the matching image. If a model template includes weight (index value of each region based on the number of occurrences of the features or the kurtosis of the distribution), the similarity is calculated by weighting based on the index value for each region when the similarity (matching score) of the entire image is calculated.

One or more embodiments of the present invention extracts features from images obtained by applying various variations to a model image and generates a model template so that detection can be made which is robust to variations of the environment and an object at the time of matching.

The model template is generated using only the features with a high frequency of occurrence, and this increases the speed of the matching process. Since the features with less frequency of occurrence contribute little to the matching score, detection can be made which is also robust to unexpected variations.

If only features of image regions characterizing an object (i.e., regions where the number of occurrences is large or where the kurtosis is high) are used, the speed of the process increases. Additionally, regions that are not stable against various variations are not used and thus detection can be made which is robust also to unexpected variations. Employing the weight of each region based on the multitude of occurrences and the degree of kurtosis enables more accurate detection.

One or more embodiments of the present invention is also applicable to the case where features that do not take continuous quantities are used and it is also applicable to the case where the feature distribution has multiple peaks. The "Geometric Blur" described in Berg, Alexander C., and Jitendra Malik. "Geometric blur for template matching." Computer Vision and Pattern Recognition, 2001. CVPR 2001. Proceedings of the 2001 IEEE Computer Society Conference on. Vol. 1. IEEE, 2001 is applicable only to features that take continuous quantities and have a unimodal distribution. Accordingly, one or more embodiments of the present invention is applicable to more types of features.

[Modifications]

Although one or more of the above embodiments employs the brightness gradient direction feature, it may employ any feature that is a quantized value. For example, a brightness value (e.g., 0-255), brightness value comparison (representing magnitude relation for each relative position relation by "0" or "1"), and a wavelet transformation feature may be employed.

Although the above description assumes that a model image and a matching image are still images, the model image and the matching image may be a series of still images (i.e., a moving image). The processes of generating and matching a model template for the moving image also may be performed in the same manner as the processes for the still image described above, and thus one or more embodiments of the present invention is also applicable to the moving image. Note that when variations are applied to the moving image, the above-described variations are applied to still images of the moving image, and in addition to that, new variations, such as gradually varying the brightness and randomly changing time series intervals of the still images, may be applied.

While the device performs both the generation of a model template and the image matching process in the above description, it will be appreciated that one device may perform the generation of the model template and the other device may perform the image matching process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image matching method performed by an image matching device, comprising:
   acquiring a model image;
   generating a plurality of variation images by applying to the model image variations that are different from each other;
   extracting features from each of the plurality of variation images;
   generating a model template based on the features; and
   performing template matching using an image to be matched and the model template,
   wherein the extracting the features comprises segmenting the variation image into a plurality of regions and extracting the feature of each region, and
   wherein the generating the model template comprises generating the model template using the features of the regions where a kurtosis of a feature distribution is higher than or equal to a predetermined threshold.

2. An image matching method performed by an image matching device, comprising:
   acquiring a model image;
   generating a plurality of variation images by applying to the model image variations that are different from each other;
   extracting features from each of the plurality of variation images;
   generating a model template based on the features; and
   performing template matching using an image to be matched and the model template,
   wherein the extracting the features comprises segmenting the variation image into a plurality of regions and extracting the feature of each region,
   wherein the generating the model template comprises assigning an index value for the region to each of the regions based on a kurtosis of the distribution of the features extracted in the extracting the features, and wherein the performing the template matching uses the index value assigned to each of the regions as a weight.

3. A model template generation method performed by a model template generation device, comprising:

acquiring a model image;

generating a plurality of variation images by applying to the model image variations that are different from each other;

extracting features from each of the plurality of variation images;

generating a model template based on the features; and performing template matching using an image to be matched and the model template, wherein the extracting the features comprises segmenting the variation image into a plurality of regions and extracting the feature of each region, and wherein the generating the model template comprises generating the model template using the features of the regions where a kurtosis of a feature distribution is higher than or equal to a predetermined threshold.

4. A model template generation device comprising:

a model image acquisition unit that acquires a model image;

a variation image generator that generates a plurality of variation images by applying to the model image variations that are different from each other;

a feature extractor that extracts features from each of the plurality of variation images; and a template generator that generates a model template based on the features, wherein the extracting the features comprises segmenting the variation image into a plurality of regions and extracting the feature of each region, and wherein the generating the model template comprises generating the model template using the features of the regions where a kurtosis of a feature distribution is higher than or equal to a predetermined threshold.

* * * * *